United States Patent
Tanigawa et al.

(10) Patent No.: US 7,523,104 B2
(45) Date of Patent: Apr. 21, 2009

(54) APPARATUS AND METHOD FOR SEARCHING STRUCTURED DOCUMENTS

(75) Inventors: Hitoshi Tanigawa, Higashiyamato (JP); Kazuhisa Koda, Tokyo (JP)

(73) Assignees: Kabushiki Kaisha Toshiba, Tokyo (JP); Toshiba Solutions Corporation, Tokyo (JP)

(*) Notice: Subject to any disclaimer, the term of this patent is extended or adjusted under 35 U.S.C. 154(b) by 336 days.

(21) Appl. No.: 11/228,258

(22) Filed: Sep. 19, 2005

(65) Prior Publication Data

US 2006/0069677 A1 Mar. 30, 2006

(30) Foreign Application Priority Data

Sep. 24, 2004 (JP) ............................. 2004-277888

(51) Int. Cl.
*G06F 17/30* (2006.01)
*G06F 17/28* (2006.01)

(52) U.S. Cl. ............... 707/4; 707/5; 707/6; 707/10; 707/104.1; 706/55; 715/234; 704/7; 704/9; 704/10

(58) Field of Classification Search ............ 707/3, 707/4, 2, 100, 102, 104.1; 709/217, 227, 709/246
See application file for complete search history.

(56) References Cited

U.S. PATENT DOCUMENTS

| | | | | |
|---|---|---|---|---|
| 5,740,425 A * | 4/1998 | Povilus | ............... | 707/100 |
| 5,819,260 A * | 10/1998 | Lu et al. | ............... | 707/3 |
| 6,496,820 B1 * | 12/2002 | Tada et al. | ............... | 707/5 |
| 6,804,662 B1 * | 10/2004 | Annau et al. | ............... | 707/2 |
| 6,804,677 B2 * | 10/2004 | Shadmon et al. | ............... | 707/101 |
| 6,889,223 B2 * | 5/2005 | Hattori et al. | ............... | 707/3 |
| 6,973,458 B1 * | 12/2005 | Maeda et al. | ............... | 707/101 |
| 7,054,854 B1 * | 5/2006 | Hattori et al. | ............... | 707/3 |
| 2002/0055932 A1 * | 5/2002 | Wheeler et al. | ............... | 707/104.1 |
| 2002/0091835 A1 * | 7/2002 | Lentini et al. | ............... | 709/227 |
| 2003/0069880 A1 * | 4/2003 | Harrison et al. | ............... | 707/3 |
| 2004/0064447 A1 * | 4/2004 | Simske et al. | ............... | 707/5 |
| 2004/0098380 A1 * | 5/2004 | Dentel et al. | ............... | 707/3 |
| 2004/0123233 A1 * | 6/2004 | Cleary et al. | ............... | 715/513 |
| 2004/0193627 A1 * | 9/2004 | Matsuda | ............... | 707/100 |
| 2004/0205615 A1 * | 10/2004 | Birder | ............... | 715/523 |
| 2005/0065947 A1 * | 3/2005 | He et al. | ............... | 707/100 |
| 2005/0108200 A1 * | 5/2005 | Meik et al. | ............... | 707/3 |
| 2005/0154690 A1 * | 7/2005 | Nitta et al. | ............... | 706/46 |
| 2005/0289182 A1 * | 12/2005 | Pandian et al. | ............... | 707/104.1 |

FOREIGN PATENT DOCUMENTS

JP 2001-147933 5/2001

* cited by examiner

*Primary Examiner*—Pierre M Vital
*Assistant Examiner*—Christopher P Nofal
(74) *Attorney, Agent, or Firm*—Finnegan, Henderson, Farabow, Garrett & Dunner, L.L.P.

(57) ABSTRACT

A synonym search section searches a synonym dictionary for synonym group identifiers indicating synonym groups to which tags included in first structure-designating information from a terminal belong. Based on a search result, a structure-designating-information generation section generates second structure-designating information in which the tags included in the first structure-designating information are replaced with the respective synonym group identifiers indicating the synonym groups. A synonym-structure-template search section searches a synonym-structure-template management block for a synonym structure template that matches the second structure-designating information. An acquisition section acquires, from a database, a document structure in a structured document indicated by a structure template corresponding to the detected synonym structure template.

11 Claims, 8 Drawing Sheets

FIG. 2A

```
<book>
    <currency>
        <title>efficient asset management</title>
        <author>Taro Tokyo</author>
        <title>explication! foreign exchange rate</title>
        <author>Jiro Tokyo</author>
    </currency>
</book>
```
~41

FIG. 2B

```
<journal>
    <money>
        <heading>saving techniques</heading>
        <writer>Taro Tokyo</writer>
    </money>
</journal>
```
~42

FIG. 2C

```
<technical journal>
    <metal>
        <gold>
            <headline>Basic properties of Au</headline>
            <writer>Saburo Tokyo</writer>
        </gold>
    </metal>
</technical journal>
```
~43

FIG. 2D

```
<magazine>
    <money>
        <caption>approach to stock</caption>
        <author>Shiro Tokyo</author>
    </money>
</magazine>
```
~44

```
<template ID : page number, position on page>
 1 : (1, 1)
 2 : (1, 2)
 3 : (1, 3)  (1, 5)
 4 : (1, 4)  (1, 6)
 5 : (2, 1)
 6 : (2, 2)
 7 : (2, 3)
 8 : (2, 4)
 9 : (3, 1)
10 : (3, 2)
11 : (3, 3)
12 : (3, 4)
13 : (3, 5)
14 : (4, 1)
15 : (4, 2)
16 : (4, 3)
17 : (4, 4)
```

FIG. 3B

```
<template ID : structure template>
 1 : /book
 2 : /book/currency
 3 : /book/currency/title
 4 : /book/currency/author
 5 : /journal
 6 : /journal/money
 7 : /journal/money/heading
 8 : /journal/money/writer
 9 : /technical journal
10 : /technical journal/metal
11 : /technical journal/metal/gold
12 : /technical journal/metal/gold/headline
13 : /technical journal/metal/gold/writer
14 : /magazine
15 : /magazine/monery
16 : /magazine/monery/caption
17 : /magazine/monery/author
```

FIG. 3A

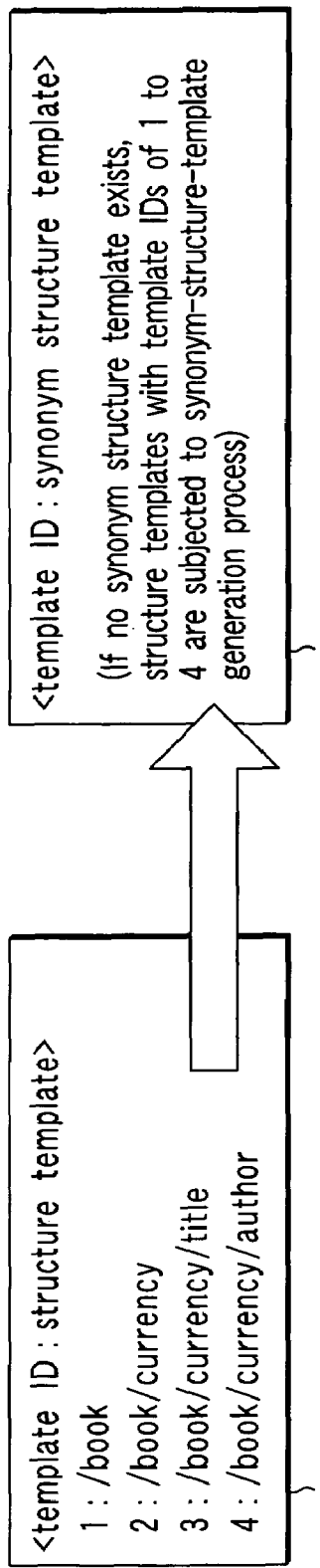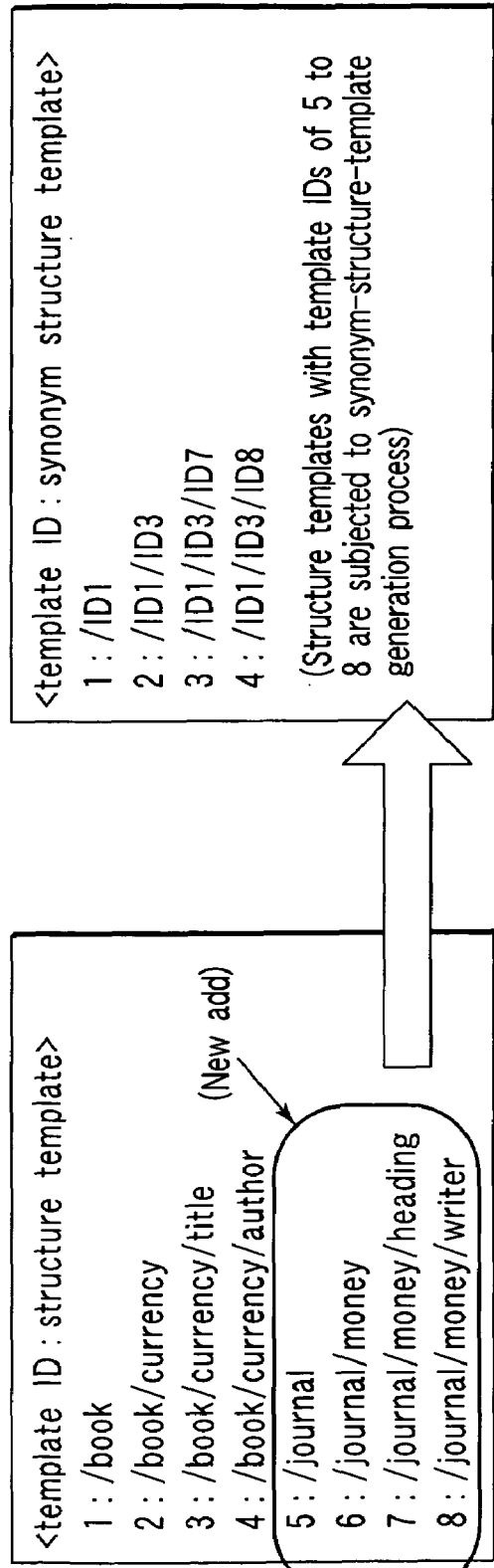
FIG. 5A
FIG. 5B

```
<synonym group (group ID) : synonyms included>
book      (ID1) : book, booklet, documment, pamphlet, volume, ···
magazine  (ID2) : journal, magazine, newspaper, press, publication, ···
money     (ID3) : bread, coin, currency, gold, money, ···
metal     (ID4) : metal, ore, ···
gold      (ID5) : Au, gold, ···
alminum   (ID6) : Al, aluminum, ···
title     (ID7) : caption, heading, headline, title, ···
author    (ID8) : author, writer, ···
··········       : ···········
```

FIG. 6

```
<template ID : synonym structure template>
    1 : /ID1
    2 : /ID1/ID3
    3 : /ID1/ID3/ID7
    4 : /ID1/ID3/ID8
    5 : /ID2
    6 : /ID2/ID3
    7 : /ID2/ID3/ID7
    8 : /ID2/ID3/ID8
    9 : /technical journal
   10 : /technical journal/ID4
   11 : /technical journal/ID4/ID5
   12 : /technical journal/ID4/ID5/ID7
   13 : /technical journal/ID4/ID5/ID8
   14 : /ID2
   15 : /ID2/ID3
   16 : /ID2/ID3/ID7
   17 : /ID2/ID3/ID8
```

FIG. 7

APPARATUS AND METHOD FOR SEARCHING STRUCTURED DOCUMENTS

CROSS-REFERENCE TO RELATED APPLICATIONS

This application is based upon and claims the benefit of priority from prior Japanese Patent Application No. 2004-277888, filed Sep. 24, 2004, now Japanese Publication no. 2006092316, published Apr. 6, 2006, the entire contents of which are incorporated herein by reference.

BACKGROUND OF THE INVENTION

1. Field of the Invention

The present invention relates to an apparatus and method for searching structured documents for a document structure contained therein, utilizing synonyms of tags.

2. Description of the Related Art

Extensible Markup Language (XML) is widely utilized as means for describing data. Documents written using XML is called XML documents. XML documents are known as structured documents represented in a logical tree structure using tags. The XML documents contain document structures (logical structures). In a document search for searching for such a document structure, a detailed search is possible by a search request based on the document structure. This search can realize a search of a higher accuracy than a keyword search, and provides only data users would like to use. Further, in these years, a technique (prior art) has been proposed for searching at high speed an XML document for a desired structure portion, utilizing a structure index (see, for example, Jpn. Pat. Appln. KOKAI Publication No. 2001-147933).

Assume here the case where a plurality of tags expressed in different ways and having the same meaning are simultaneously searched for, using structure designation information, called an XPath scheme, for designating an arbitrary document structure. In this case, it is necessary to connect a plurality of expressions having the same meaning, using an operator "|" or a logical operator "or". Therefore, search omission will occur unless all synonyms of tags as search targets are accurately determined and contained in the structure designation information. Furthermore, if all synonyms are contained in the structure designation information, this information (XPath scheme) becomes very complex.

BRIEF SUMMARY OF THE INVENTION

In accordance with an embodiment of the invention, there is provided a structured-document search apparatus for searching a plurality of structured documents stored in a database for a document structure in a structured document corresponding to first structure-designating information, in response to a search request containing the first structure-designating information and issued from a client terminal. The first structure-designating information designates an arbitrary document structure including tags. The structured-document search apparatus comprises: structure-template-storing means for storing a plurality of structure templates as templates of tag structures in relation to identifiers assigned to the structure templates, the structure templates corresponding to document structures included in the structured documents stored in the database; a synonym dictionary which stores synonym group identifiers indicating synonym groups, and tags belonging to the synonym groups, the each synonym group being a set of tags having a common concept; synonym search means for search processing for searching the synonym dictionary for synonym group identifiers indicating synonym groups to which the tags included in the first structure-designating information belong; structure-designating-information generation means for generating, based on a search result of the synonym search means for search processing, second structure-designating information in which the tags included in the first structure-designating information are replaced with the respective synonym group identifiers indicating the synonym groups to which the tags belong; synonym-structure-template-storing means for storing synonym structure templates in which all tags included in the structure templates stored in the structure-template-storing means are replaced with the synonym group identifiers indicating the synonym groups to which the all tags belong; synonym-structure-template-searching means for searching the synonym-structure-template-storing means for a synonym structure template corresponding to the second structure-designating information; and acquisition means for acquiring, from the database, a document structure in a structured document indicated by the structure template searched for by the synonym-structure-template-searching means.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 2A, 2B, 2C and 2D are views illustrating examples of four XML document 41, 42, 43 and 44 stored in the database 15 appearing in FIG. 1;

FIGS. 3A and 3B are views illustrating respective data structure examples of the structure-template management block 151a and the structure posting area 151b included in the structure-index management block 151 and appearing in FIG. 1, the data structure examples corresponding to the XML documents 41 to 44 of FIGS. 2A to 2D;

FIGS. 5A and 5B are views useful in explaining targets to be subjected to a synonym-structure-template generation process;

FIG. 6 is a view illustrating an example of the synonym dictionary 15 appearing in FIG. 1;

FIG. 7 is a view illustrating an example of the synonym-structure-temperate management block 152 appearing in FIG. 1;

DETAILED DESCRIPTION OF THE INVENTION

Figure 1:
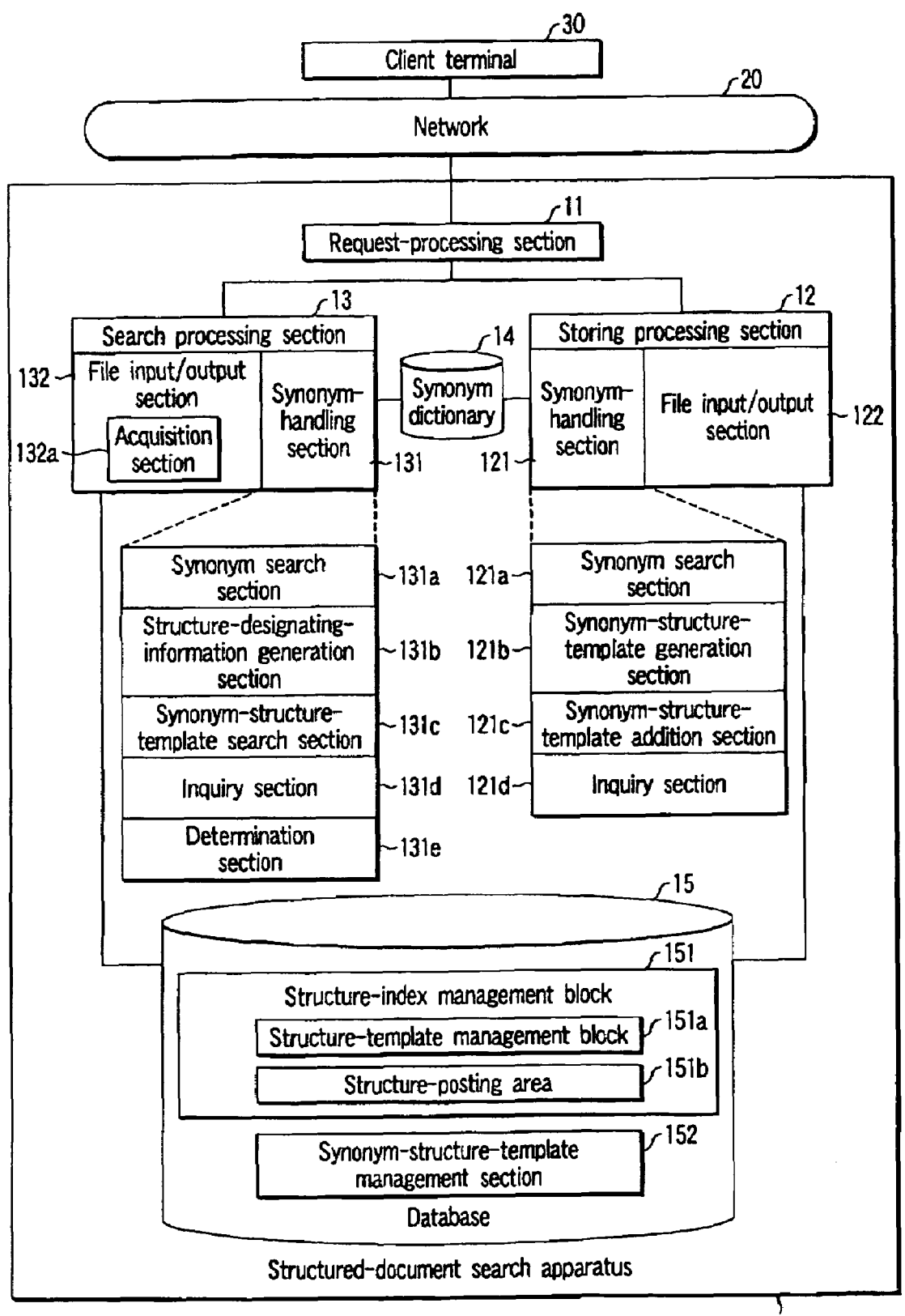
FIG. 1 is a block diagram illustrating the configuration of a structured-document search system according to an embodiment of the invention.

An embodiment of the invention will be described with reference to the accompanying drawings. FIG. 1 is a block diagram illustrating the configuration of a structured-document search system according to the embodiment. The structured-document search system of FIG. 1 comprises a structured-document search apparatus 10, network 20 and client terminal 30. The client terminal 30 is connected to the structured-document search apparatus 10 via the network 20. In FIG. 1, for facilitating the drawing, only one client terminal 30 is connected to the structured-document search apparatus 10 via the network 20. However, in general, a plurality of client terminals 30 are connected to the structured-document search apparatus 10 via the network 20.

The structured-document search apparatus 10 comprises a request-processing section 11, storing processing section 12, search processing section 13, synonym dictionary 14 and database 15. The synonym dictionary 14 and database 15 are stored in a computer-readable storage medium, such as a hard disk. The storage medium for storing the synonym dictionary 14 is not always required to be rewritable, while that for storing the database 15 is required to be rewritable.

The request-processing section 11 serves as an interface processing section between the structured-document search apparatus 10 and the client terminal 30. The request-processing section 11 receives, from the client terminal 30, a request directed to the database 15, such as a search request or storage request. The request-processing section 11 determines the type of the received request, and supplies it to the storing processing section 12 or search processing section 13, in accordance with the determination result. In this embodiment, a storage request is supplied to the storing processing section 12, and a search request is supplied to the search processing section 13.

The storing processing section 12 analyzes the storage request, and stores the requested structured document into the database 15. The storing processing section 12 includes a synonym-handling section 121 and file input/output section 122. The synonym-handling section 121 mainly generates a structure index (synonym structure template) for a synonym search, described later in detail, with reference to the synonym dictionary 14. The file input/output section 122 stores, into the database 15, the structure index (synonym structure template) generated by the synonym-handling section 121, and the structured document (structured-document data) requested by the client terminal 30. Assume here that structured documents are XML documents.

The synonym-handling section 121 includes a synonym search section 121a for storing processing, synonym-structure-template generation section 121b, synonym-structure-template addition section 121c and inquiry section 121d. The synonym search section 121a operates when a structure template corresponding to a new document structure that does not exist in a structure-template management block 151a, described later, is added to the structure-template management block 151a. The synonym search section 121a searches the synonym dictionary 14 for synonym group IDs uniquely assigned to synonym groups to which all tags included in the added structure template belong. The addition of a structure template is executed when a structured document is stored into the database 15 in accordance with a request from the client terminal 30, or when the structured document in the database 15 are updated.

The synonym-structure-template generation section 121b generates a synonym structure template in which all tags included in the added structure template are replaced with the synonym group IDs of the synonym groups corresponding to the tags, the synonym group IDs being detected by the synonym search section 121a. The synonym-structure-template addition section 121c adds, to a synonym-structure-temperate management block 152, the synonym structure template generated by the synonym-structure-template generation section 121b. When the synonym search section 121a has detected a plurality of synonym group IDs for a certain tag, the inquiry section 121d inquires of the user of the client terminal 30 which one of the synonym groups indicated by the synonym group IDs should be selected to process the certain tag.

The search processing section 13 analyzes the search request and generates a search result that satisfies the search request. The search request (XPath search request) includes an XPath scheme as structure-designating information (first structure-designating information). The XPath scheme includes one or more tags. The search processing section 13 includes a synonym-handling section 131 and file input/output section 132. The synonym-handling section 131 mainly generates a search expression for a synonym search, described later in detail, with reference to the synonym dictionary 14. The file input/output section 132 accesses the database 15 based on the search expression generated by the synonym-handling section 131, thereby acquiring a search result. The search result is transferred to the request process section 11 and then to the client terminal 30 as a requester.

The synonym-handling section 131 includes a synonym search section 131a for search processing, structure-designating-information generation section 131b, synonym-structure-template search section 131c, inquiry section 131d and determination section 131e. The synonym search section 131a searches the synonym dictionary 14 for synonym group IDs uniquely assigned to synonym groups to which all tags included in the XPath scheme designated by the search request belong.

The structure-designating-information generation section 131b generates an XPath scheme (second structure-designating information) in which all tags included in the above-mentioned XPath scheme (first structure-designating information) are replaced with the synonym group IDs of the synonym groups corresponding to the tags, the synonym group IDs being detected by the synonym search section 131a. The synonym-structure-template search section 131c searches the synonym-structure-temperate management block 152 for a synonym structure template coinciding with the XPath scheme (second structure-designating information) generated by the structure-designating-information generation section 131b. When the synonym search section 131a has detected a plurality of synonym group IDs for a certain tag, the inquiry section 131d inquires of the user of the client terminal 30 which one of the synonym groups indicated by the synonym group IDs should be selected to process the certain tag. When the XPath scheme (first structure-designating information) contains a tag designated by the search request as a target to be subjected to a synonym search, the determination section 131e performs the following determination in units of synonym structure templates retrieved by the synonym-structure-template search section 131c. Namely, the determination section 131e determines whether the document structure designated by the XPath scheme except for the tag subjected to the synonym search is identical to a corresponding document structure included in the structure template that corresponds to each synonym template structure.

The file input/output section 132 includes an acquisition section 132a. The acquisition section 132a acquires, from the database 15, a document structure in the structured document indicated by the structure template corresponding to the synonym structure template retrieved by the synonym-structure-template search section 131c.

The request-processing section 11, storing processing section 12 and search processing section 13 in the structured-document search apparatus 10 are realized by a computer's reading particular programs installed therein and corresponding to the sections 12 and 13, and executing the read programs. These programs may be distributed, stored in a computer-readable storage medium, or may be downloaded (distributed) via a network.

A description will now be given of the structure index for a synonym search. In the embodiment, the structure index is utilized for a search request issued from the client terminal 30. The structure index is known as a technique for searching a database (the database 15 in the embodiment) for an XML document at high speed. More specifically, the structure index is a technique utilized, to store an XML document in a database, for extracting the structure information concerning the document, converting it into a structure template, and associating the template with a record indicating its actual position in the database, using a template identifier (template ID) uniquely assigned to the template. To this end, the database 15 stores a structure-index file. The structure-index file employed in the embodiment is formed of the structure-index management block 151 and synonym-structure-temperate management block 152 shown in FIG. 1. Further, as shown in FIG. 1, the structure-index management block 151 includes a structure-template management block 151a and structure-posting area 151b. These blocks will be described later.

FIGS. 2A, 2B, 2C and 2D show examples of four XML documents 41, 42, 43 and 44, respectively. FIGS. 3A and 3B show the data structure examples of the structure-template management block 151a and structure-posting area 151b, respectively, the data structure examples corresponding to the XML documents 41 to 44 of FIGS. 2A to 2D.

As shown in FIG. 3A, the structure-template management block 151a is storage (structure template storage) for storing a list of template identifiers (template IDs) and structure templates that indicate the templates of the tag structures of XML documents to which the template IDs are assigned. As shown in FIG. 3B, the structure-posting area 151b is storage (structure-template-position storage) for storing a list of template IDs and position information that indicates the positions of the structure templates with the template IDs in the database 15. The position information comprises page-number information and information indicating the position of each structure template in the corresponding page.

The "page" is a unit of storage of XML documents in the database 15. In the example of FIG. 3B, the XML document 41 shown in FIG. 2A is stored on the first page, and the XML document 42 shown in FIG. 2B is stored on the second page. Further, the XML document 43 shown in FIG. 2C is stored on the third page, and the XML document 44 shown in FIG. 2D is stored on the fourth page. In the embodiment, positions on a page, at which the structure templates of an XML document are stored, are assigned to the templates in order beginning with the leading template. Actually, however, the order of assignment of positions is not limited to this.

In the embodiment, for a search in which a tag structure, which is expressed in the form of, for example, "/metal/gold", is, designated, the structure-index management block 151 (structure index) formed of the structure-template management block 151a shown in FIG. 3A and the structure-posting area 151b shown in FIG. 3B is utilized. The use of the structure-index management block 151 enables a search designating a tag structure to be performed at high speed simply by scanning templates without accessing actual data. In particular, in the embodiment, a search using synonyms of a tag is realized utilizing the structure index. Namely, in the embodiment, a search (XPath search) using synonyms of a tag is realized utilizing a synonym structure template necessary for executing a search of synonyms. The synonym structure template is generated based on the structure template contained in the structure index.

A synonym structure template is acquired by replacing tags included in a structure template with synonym group IDs. The synonym structure template and structure template are in 1:1 relationship. To generate a synonym structure template, the synonym-structure-template generation section 121b of the synonym-handling section 121 uses the synonym dictionary 14 for the replacement of tags included in the tag structure indicated by a structure template with template ID. As a result, a synonym structure template is generated, in which all tags in the tag structure are replaced with synonym-group identifiers (synonym group IDs) uniquely assigned to the synonym groups corresponding to the tags. The thus-generated synonym structure template is associated with template ID. The structure of the synonym dictionary 14, the synonym group and the synonym group ID will be described later.

Figure 4:
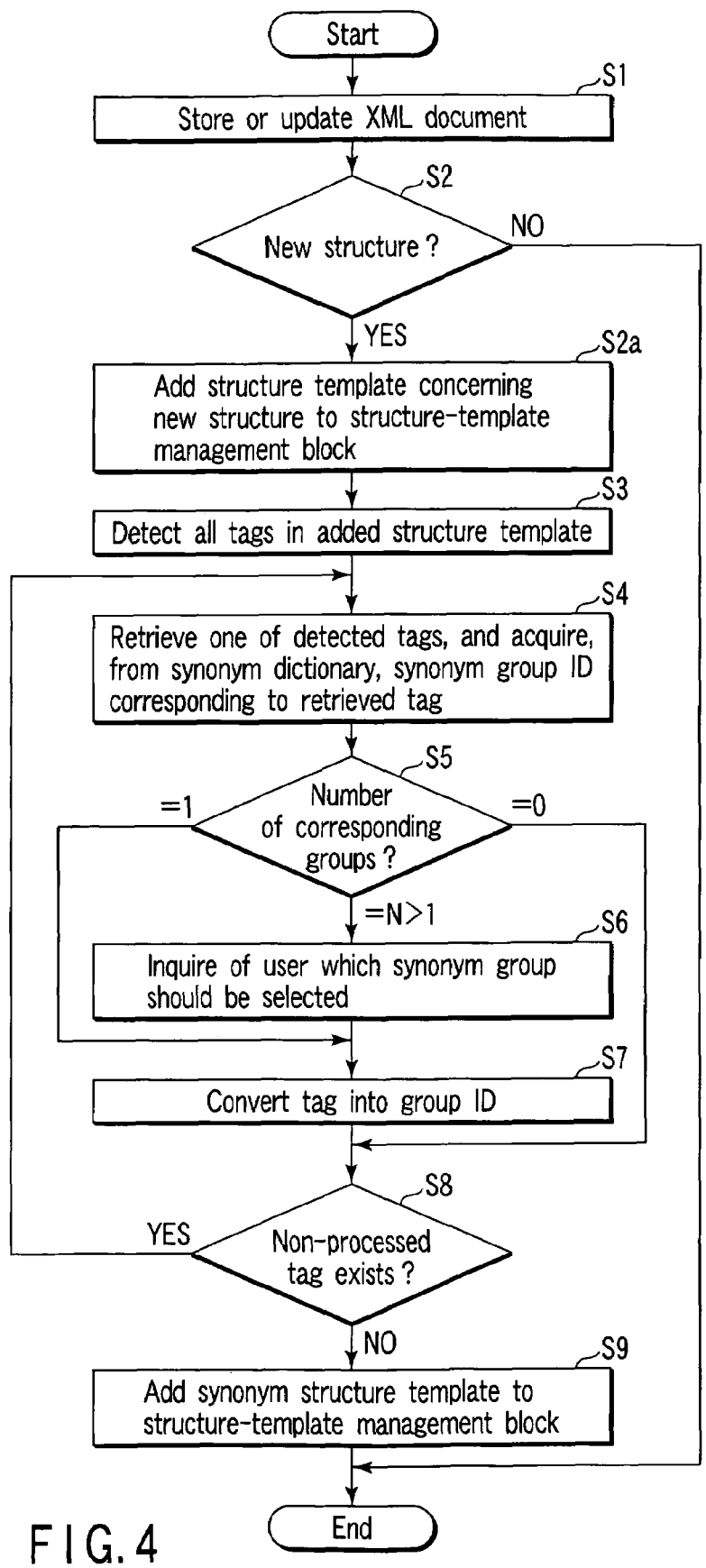
FIG. 4 is a flowchart illustrating the procedure of a process for generating a synonym structure temperate.

Referring to the flowchart of FIG. 4, a description will now be given of the process of generating a synonym structure template by the synonym-structure-template generation section 121b of the synonym-handling section 121. Firstly, assume that the file input/output section 122 of the storing processing section 12 has stored an XML document in the database 15 or has updated an XML document stored in the database 15, in response to a request from the client terminal 30 (step S1). In this case, the synonym-handling section 121 of the storing processing section 12 refers to the structure-template management block 151a stored in the database 15, thereby determining whether a new tag structure that is not yet stored in the structure-template management block 151a is contained in the XML document stored or updated by the file input/output section 122 (step S2).

If no new tag structure is contained, the synonym-handling section 121 determines that synonym structure templates corresponding to all structure templates have already been generated, and finishes the processing. In contrast, if a new tag structure is contained, the synonym-handling section 121 adds, to the structure-template management block 151a, information concerning the new tag structure, i.e., a structure template (step S2a). The synonym-handling section 121 detects the tag (or tags) existing in the added structure template (step S3). This added structure template is a target of synonym-structure-template generation processing.

Referring to FIGS. 5A and 5B, the target of synonym-structure-template generation processing will be described. FIG. 5A shows first structure template examples to be subjected to synonym-structure-template generation processing. In this case, it is assumed that information (structure template) concerning a new tag structure is stored in the structure-template management block 151a for the first time. In this state, no synonym structure template is contained in the synonym-structure-temperate management block 152, and all structure templates (in the case of FIG. 5A, structure templates with template IDs of 1 to 4) in the structure-template management block 151a are regarded as targets of synonym-structure-template generation processing.

FIG. 5B shows second structure template examples to be subjected to synonym-structure-template generation processing. In this case, it is assumed that some structure templates (in the case of FIG. 5B, structure templates with template IDs of 1 to 4) are already stored in the structure-template management block 151a. It is also assumed that synonym structure templates corresponding to the structure templates already stored in the structure-template management block 151a are added to the synonym-structure-temperate management block 152. It is further assumed that after addition of the synonym structure templates, information concerning new structure (in the case of FIG. 5B, information concerning structure templates with template IDs of 5 to 8) is added to the structure-template management block 151*a*. In this state, the added structure templates (i.e., the structure templates with template IDs of 5 to 8) are regarded as targets of synonym-structure-template generation processing.

After detecting all tags existing in the added structure templates (step S3), the synonym-handling section 121 serves as the synonym search section 121*a*. The synonym search section 121*a* retrieves one of the detected tags (step S4), thereby searching the synonym dictionary 14 for the ID (or IDs) of a synonym group (or groups) that contains the retrieved tag (step S4). This search is called a synonym search.

FIG. 6 shows an example of the synonym dictionary 14. In the synonym dictionary 14 of FIG. 6, a list of expressions having a common concept is managed as a synonym group (concept group). Note that in the embodiment, the synonyms managed by the synonym dictionary 14 are more likely regarded as "terms common in concept" than "terms having the same meaning". Of course, a synonym dictionary may be used, in which synonyms are used as original ones, i.e., "terms having the same meaning", and groups of such synonyms are managed. The synonym dictionary 14 of FIG. 6 contains synonym group names (concept group names), synonym group IDs and specific synonyms, which correspond to preset synonym groups (concept groups). A typical one included in the synonyms belonging to each synonym group is used as the synonym group name of each synonym group. Each group ID is a identifier uniquely assigned to the corresponding synonym group.

If a single synonym group ID is acquired from the synonym search based on the retrieved tag, i.e., if the synonym group ID is uniquely determined (i.e., if the answer at step S5 is "N=1"), the synonym-handling section 121 serves as the synonym-structure-template generation section 121*b*. The synonym-structure-template generation section 121*b* converts (replaces) the retrieved tag into (with) the determined synonym group ID (step S7).

In contrast, if a plurality of synonym group IDs are acquired from the synonym search based on the retrieved tag (i.e., if the answer at step S5 is "N>1"), the synonym-handling section 121 proceeds to step S6, where it serves as the inquiry section 121*d*. Using the request-processing section 11, the inquiry section 121*d* inquires of the user of the client terminal 30 to which one of the synonym groups indicated by the acquired synonym group IDs the tag used for the synonym search is made to belong. This inquiry is realized by transmitting a list of acquired synonym group IDs from the request-processing section 11 to the client terminal 30, and displaying them on the client terminal 30. When the user selects (designates) one of the synonym group IDs, the synonym-handling section 121 again serves as the synonym-structure-template generation section 121*b*. The synonym-structure-template generation section 121*b* converts (replaces) the tag used for the synonym search into (with) the selected synonym group ID (step S7). Further, if no synonym group is detected in the synonym dictionary 14 and hence no synonym group ID is acquired from the synonym search (i.e., if the answer at step S5 is "N=0"), the synonym-handling section 121 leaves the tag used for the synonym search as it is.

If a plurality of tags are acquired at step S3, the synonym-handling section 121 performs the processes of steps S4 to S7 on each of the tags (step S8). By thus repeating the processes of steps S4 to S7, synonym structure templates are generated in which the tags included in the structure templates added to the structure-template management block 151*a* are replaced with synonym group IDs uniquely assigned to the synonym groups corresponding to the tags. Thereafter, the synonym-handling section 121 serves as the synonym-structure-template addition section 121*c*, and adds, to the synonym-structure-temperate management block 152, all synonym structure templates including synonym group IDs and generated (acquired) by the repeated processing (step S9). Thus, the synonym-structure-temperate management block 152 is used as synonym-structure-temperate storage for storing synonym structure templates. As shown in FIG. 5B, synonym structure templates are acquired by replacing the tags in structure templates with synonym group IDs assigned to the synonym groups to which the tags belong.

FIG. 7 shows an example of the synonym-structure-temperate management block 152. In this synonym-structure-temperate management block example, the synonym structure templates generated from the structure templates in the structure-template management block 151*a* of FIG. 3A are added. For the generation of the synonym structure templates, the synonym dictionary 14 of FIG. 6 is used. As is apparent from the synonym dictionary 14 of FIG. 6, the tag "gold" in FIG. 3A belongs to two synonym groups, i.e., the group "money" (ID3) and the group "gold" (ID5). Accordingly, if a synonym search concerning the tag "gold" is performed on the synonym dictionary 14, two synonym group IDs are acquired (step S4). In this case, the user is inquired of to which group the tag "gold" should belong. In the example of FIG. 7, it is assumed that the user has designated the group "gold" (ID5), to which the tag "gold" should belong. Further, in the synonym-structure-temperate management block example of FIG. 7, the tag "technical journal", to which no group ID is assigned, exists. This means that the synonym dictionary 14 does not store a synonym group to which the tag "technical journal" belongs, and hence that in all structure templates including the tag "technical journal", the tag "technical journal" is replaced with no synonym group ID.

Figure 8:
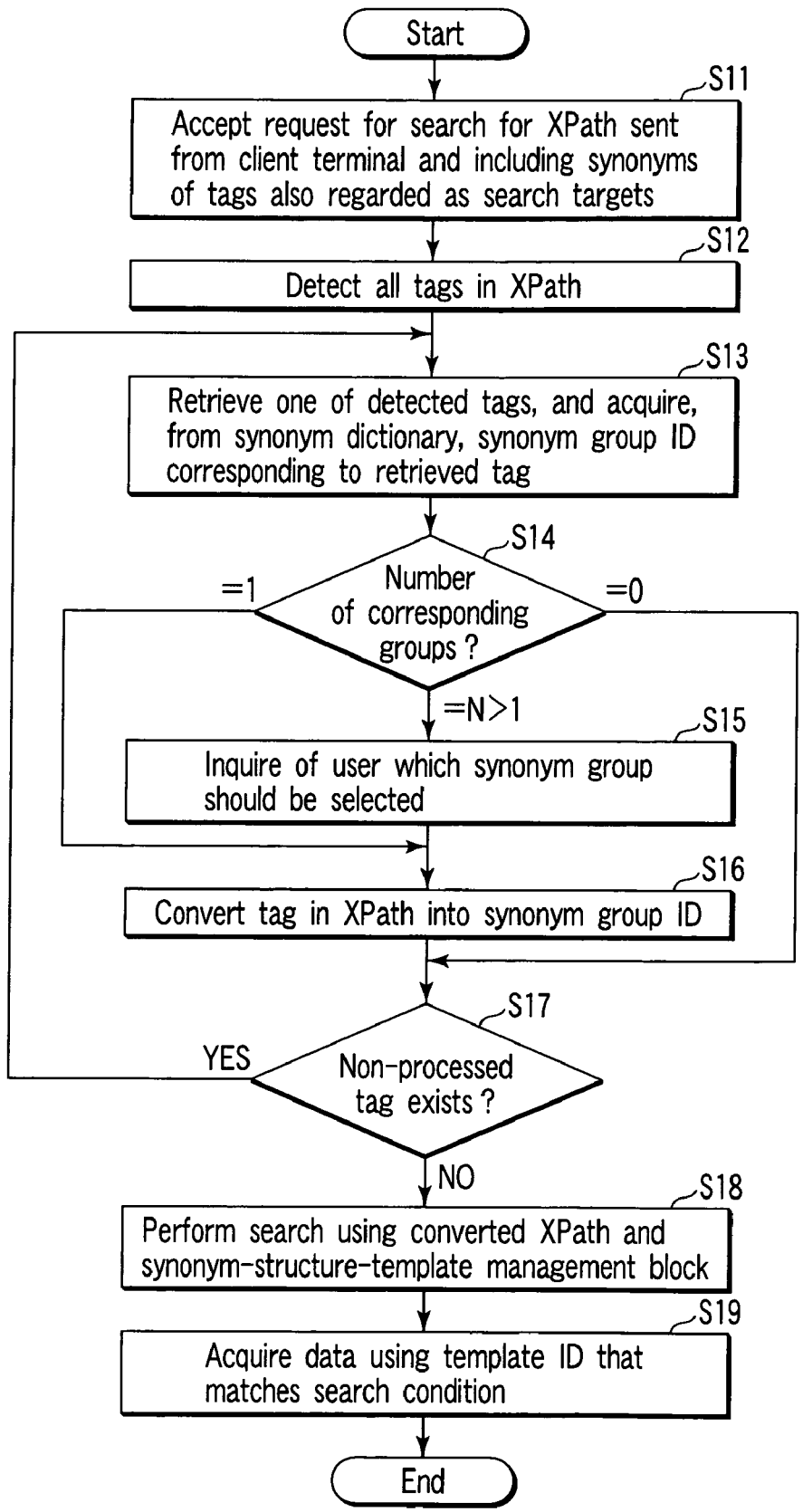
FIG. 8 is a flowchart illustrating the procedure of a process for searching for the synonyms of tags, performed in the embodiment.

Referring now to the flowchart of FIG. 8, a description will be given of a process for searching for the synonyms of tags, which is performed using the synonym-structure-temperate management block 152 that stores the synonym structure templates generated in accordance with the flowchart of FIG. 4. Firstly, assume that a request for an XPath search, in which the synonyms of tags are also regarded as search targets, is issued from the client terminal 30 to the structured-document search apparatus 10 via the network 20. This search request includes the XPath scheme as structure-designating information. The request-processing section 11 of the structured-document search apparatus 10 receives the search request from the client terminal 30 (step S11). This request is transferred from the request-processing section 11 to the search-processing section 13. The synonym-handling section 131 of the search-processing section 13 detects all tags specified in the XPath scheme that is included in the search request (step S12). After that, the synonym-handling section 131 serves as the synonym search section 131*a*. The synonym search section 131*a* retrieves one of the detected tags and searches the synonym dictionary 14 for an ID or IDs (synonym group ID or IDs) assigned to a synonym group or groups to which the detected tags belong (step S13).

If a single synonym group ID is determined from a synonym search concerning the retrieved tag (a tag in the XPath scheme) (i.e., if the answer at step S14 is "N=1"), the synonym-handling section 131 serves as the structure-designating-information generation section 131*b*. To generate structure-designating information (i.e., to generate. an XPath scheme for a synonym search), the structure-designatinginformation generation section 131*b* converts (replaces) the tag retrieved from the above-mentioned XPath scheme (for the synonym search) into (with) a synonym group ID (step S16).

In contrast, if a plurality of synonym group IDs are acquired from the synonym search (i.e., if the answer at step S14 is "N>1"), the synonym-handling section 131 proceeds to step S15, where it serves as the inquiry section 131*d*. Using the request-processing section 11, the inquiry section 131*d* inquires of the user of the client terminal 30 which one of the synonym groups indicated by the acquired synonym group IDs should be searched. This inquiry is realized by transmitting a list of acquired synonym group IDs from the request-processing section 11 to the client terminal 30, and displaying them on the client terminal 30. When the user selects (designates) one of the synonym group IDs, the synonym-handling section 131 again serves as the synonym-structure-template generation section 131*b*. The synonym-structure-template generation section 131*b* converts (replaces) the tag used for the synonym search into (with) the selected synonym group ID (step S16). Further, if no synonym group is detected in the synonym dictionary 14 and hence no synonym group ID is acquired from the synonym search (i.e., if the answer at step S14 is "N=0"), the synonym-handling section 131 leaves the tag used for the synonym search as it is.

If a plurality of tags are acquired at step S12, the synonym-handling section 131 performs the processes of steps S13 to S16 on each of all tags acquired at step S12 (step S17). By thus repeating the processes of steps S13 to S16, a new XPath scheme for a synonym search, in which the tags in the XPath scheme included in the search request from the client terminal 30 are replaced with synonym group IDs, is generated. Namely, a search condition using the synonym group IDs is generated. After that, the synonym-handling section 131 serves as the synonym-structure-template search section 131*c*. Based on the new XPath scheme, i.e., the search condition using the synonym group IDs, the synonym-structure-template search section 131*c* searches the synonym-structure-temperate management block 152 for the corresponding synonym structure template (step S18). If the synonym structure template, which matches the search condition, is detected by the search, the file input/output section 132 serves as the acquisition section 132*a*. The acquisition section 132*a* acquires actual data from the database 15, using a template ID associated with the synonym structure template detected by the synonym-structure-template search section 131*c* (step S19). The acquisition section 132*a* refers to the structure-posting area 151*b* (see FIG. 3B) of the structure-index management block 151 in the database 15, using the template ID associated with the synonym structure templates that matches the search condition, thereby acquiring information (position information) stored in the structure-posting area 151*b* and associated with the template ID. Based on the thus-acquired position information (indicating page number and a position on the corresponding page), the acquisition section 132*a* accesses actual data in the database 15.

The above-described search process concerning the synonyms of tags will be described, using a specific example. In this example, it is assumed that a request to perform an XPath search based on the synonyms of the tags included in an XPath scheme "/book/gold/title" is issued from the client terminal 30 to the structured-document search apparatus 10. Further, assume that the synonym dictionary 14 of FIG. 6 and the synonym-structure-temperate management block 152 of FIG. 7 are used for the search.

The XPath scheme "/book/gold/title" includes tags "book", "gold" and "title". Firstly, a synonym search concerning each tag of the XPath scheme "/book/gold/title" is performed on the synonym dictionary 14 shown in FIG. 6. Then, concerning the tag "book", the ID (ID1) of the group "book" is acquired. Similarly, concerning the tag "gold", the respective IDs (ID3 and ID5) of the groups "money" and "gold" are acquired. Further, concerning the tag "title", the ID (ID7) of the group "title" is acquired. Thus, concerning the tag "gold", a plurality of group IDs are acquired. Therefore, the user is inquired of which one of the groups the tag "gold" should be belong to. Assume here that the user has designated the group "money" (ID3) for the tag "gold". In this case, the tags "book", "gold" and "title" included in the XPath scheme "/book/gold/title" are replaced with the IDs (ID1, ID3 and ID7) of the groups "book", "money" and "title", respectively. Namely, using these synonym group IDs, a new XPath scheme "/ID1/ID3/ID7" is generated from the XPath scheme "/book/gold/title". Execution of a search using the new XPath scheme and the synonym-structure-temperate management block 152 of FIG. 7 makes it possible to confirm that the synonym structure template with template ID:3 matches the XPath scheme "/book/gold/title". Using template ID:3, the acquisition section 132*a* of the file input/output section 132 refers to the structure posting area 151*b* of the structure-index management block 151 shown in FIG. 3B. As a result, the acquisition section 132*a* acquires information in the structure posting area 151*b* corresponding to template ID:3, namely, (page number=1, position on page 1=3) and (page number=1, position on page 1=5). Based on this information, the acquisition section 132*a* accesses actual data, thereby acquiring, as search results, the following two data items contained in the XML document 41 of FIG. 2A:

<title>efficient asset management</title>
<title>explication! foreign exchange rate</title>

These search results are supplied to the client terminal 30 by the request-processing section 11, and displayed on the client terminal 30. Note that if a conventional search is performed using the XPath scheme "/book/gold/title", no data is acquired as the search result.

As described above, in the embodiment, using the synonym dictionary 14, one or more synonym structure templates and a new XPath scheme (second structure-designating information) are generated from one or more structure templates in the structure-template management block 151*a*, and an original XPath scheme (first structure-designating information), respectively. The one or more synonym structure templates and new XPath scheme are generated by replacing the tags (tag names), included in the one or more structure templates and the original XPath scheme (first structure-designating information), with the synonym group IDs corresponding thereto. A search is executed using the synonym-structure-temperate management block 152 including the generated one or more synonym structure templates, and the generated new XPath scheme. In other words, one synonym structure template that matches the new XPath scheme (second structure-designating information), i.e., one synonym structure template that matches synonym group IDs uniquely assigned to the synonym groups to which the tags included in the original XPath scheme (first structure-designating information) belong, is searched for. As a result, in the embodiment, an XPath search using the synonyms of the tags included in the original XPath scheme can be performed without coupling the tags by operators. Further, even if a tag name that does not exist in the XML documents stored in the database 15 is specified in the original XPath scheme, the document structure corresponding to the tag name can be detected using synonyms of the tag name. This can absorb tag name variations in documents. Furthermore, when a structure template or XPath scheme contains a tag that belongs to a plurality of synonym groups, a search result can be efficiently acquired with the number of hits suppressed, by inquiring of a user which one of the synonym groups should be used.

<Modification>

In the above-described embodiment, all tags in an XPath scheme are assumed to be used as the targets of an XPath search using tag synonyms. A description will be given of a modification of the embodiment, in which, during an XPath search, a user can designate any tag they would like to search for, using a synonym of the tag. In this modification, it is assumed that the database 15 stores the synonym-structure-temperate management block 152 of FIG. 7 that includes synonym structure templates generated in accordance with the flowchart of FIG. 4.

Figure 9:
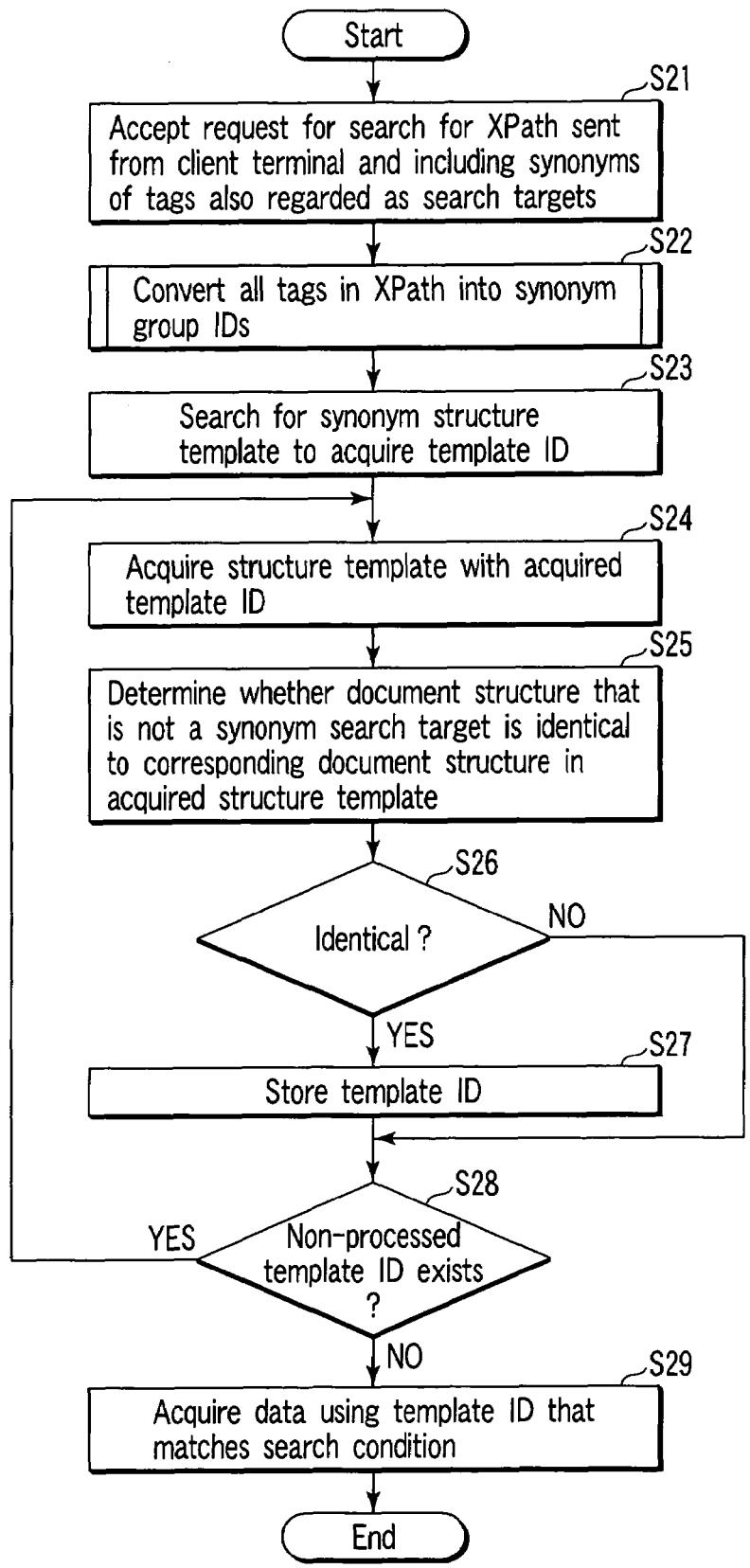
FIG. 9 is a flowchart illustrating the procedure of a process for searching for the synonyms of tags designated, performed in a modification of the embodiment.

Referring to the flowchart of FIG. 9, a description will be given of a search process for searching for synonyms of a tag designated by a user, using the synonym-structure-temperate management block 152 of FIG. 7. Firstly, assume that a request for an XPath search, in which the synonyms of tags are also regarded as search targets, is issued from the client terminal 30 to the structured-document search apparatus 10 via the network 20. This XPath search request includes means for setting, in an XPath scheme as a search condition, a tag, synonyms of which should be searched for. For instance, assume that only the tag "book" included in an XPath scheme "/bib/book/library" is subjected to a synonym search. In this case, a message, such as "/bib/synonym(book)/library" indicating that synonyms of the tag "book" should be searched for, is set in the XPath scheme. Alternatively, the tag subjected to the synonym search may be designated by transferring another parameter from the client terminal 30 to the structured-document search apparatus 10.

The request-processing section 11 of the structured-document search apparatus 10 receives the search request from the client terminal 30 (step S21). This request is transferred from the request-processing section 11 to the search-processing section 13. As in the above-described embodiment, the synonym-handling section 131 of the search-processing section 13 converts (replaces), into (with) synonym group IDs, all tags in the XPath scheme included in the search request from the request-processing section 11 (step S22). The process at step S22 is realized by the synonym search section 131a, structure-designating-information generation section 131b and inquiry section 131d in accordance with the same procedure of that of steps S12 to S17 of the flowchart shown in FIG. 7.

After the execution of step S22, the synonym-handling section 131 serves as the synonym-structure-template search section 131c as in the embodiment. Based on a new search condition (second structure-designating information) in which each tag in the original XPath scheme (first structure-designating information) is replaced with the corresponding synonym group ID, the synonym-structure-template search section 131c searches the synonym-structure-temperate management block 152 for the corresponding synonym structure template (step S23). At step S23, the synonym-structure-template search section 131c acquires a template ID associated with the synonym structure template that matches the search condition.

After that, the synonym-handling section 131 performs the following synonym search process only on the tags designated by the XPath search request from the client terminal 30. Firstly, the synonym-handling section 131 retrieves one of the template IDs acquired at step S23 by the synonym-structure-template search section 131c (step S24). At step S24, the synonym-handling section 131 acquires, from the structure-index management block 151 of FIG. 3, the structure template to which the retrieved template ID is assigned.

After executing step S24, the synonym-handling section 131 serves as the determination section 131e. The determination section 131e determines whether a document structure (which is not a synonym search target) except for the tags to be subjected to a synonym search, included in the search condition (i.e., the original search condition) designated by the search request from the client terminal 30, is identical to the corresponding document structure in the structure template acquired at step S24 (step S25). If they are identical to each other (step S26), the determination section 131e determines that the structure template matches the search condition, and stores the ID (template ID) of the structure template (step S27). In contrast, if they are not identical to each other, the determination section 131e determines that the structure template does not match the search condition. If the two document structures contain non-identical tags, they are not determined identical. If the two document structures are not identical, the structure template is not selected. After that, if it is determined that any unprocessed template ID remains (step S28), the synonym-handling section 131 performs the above process concerning the unprocessed template ID (step S24).

Thus, the synonym-handling section 131 repeatedly executes the steps beginning with step S24 and concerning all template IDs acquired at step S23 (step S28). Thereafter, the synonym-handling section 131 acquires data form the database 15 using all template IDs stored (step S29).

An example of the search process based on the synonyms of the designated tag will be described. Assume here that a request to perform an XPath search, in which only the "caption" included in an XPath scheme "/magazine/money/caption" is designated as a target of a synonym search, is issued from the client terminal 30 to the structured-document search apparatus 10. Assume also that the synonym dictionary 14 of FIG. 6 and the synonym-structure-temperate management block 152 of FIG. 7 are used for the search. Assume further that a method for directly setting any tag in the XPath scheme as a target of the synonym search is employed. In this case, an XPath scheme "/magazine/money/synonym(caption)" is used instead of the XPath scheme "magazine/money/caption".

The XPath scheme "/magazine/money/synonym(caption)" includes tags "magazine", "money" and "caption". Firstly, a synonym search concerning each tag of the XPath scheme "/magazine/money/synonym(caption)" is performed. Then, concerning the tag "magazine", the ID (ID2) of the group "magazine" is acquired. Similarly, concerning the tag "money", the ID (ID3) of the group "money" is acquired. Further, concerning the tag "caption", the ID (ID7) of the group "title" is acquired. In this case, the tags "magazine", "money" and "caption" included in the XPath scheme "/magazine/money/synonym(caption)" are replaced with the IDs (ID2, ID3 and ID7) of the groups "magazine", "money" and "title", respectively. Namely, using these synonym group IDs acquired by the synonym search, a new search condition "/ID2/ID3/ID7" is generated from the XPath scheme "magazine/money/synonym(caption)". Using the new search condition "/ID2/ID3/ID7", the following search process is executed.

Firstly, the synonym-structure-temperate management block 152 of FIG. 7 is searched to detect a synonym structure template using the search condition "/ID2/ID3/ID7". In this case, a synonym structure template with template ID:7 and a synonym structure template with template ID:16 are hit by the search condition "/ID2/ID3/ID7". The synonym-handling section 131 stores information indicating that template ID:7 and template ID:16 match the search condition "/ID2/ID3/ID7".

Subsequently, the synonym-handling section 131 acquires a structure template with template ID:7 from the structure-template management block 151a shown in FIG. 3A. The structure template with template ID:7 is "/journal/currency/heading". In this case, the synonym-handling section 131 confirms that "journal" and "currency" included in "/journal/currency/heading" do not match "magazine" and "money" included in the original XPath scheme "/magazine/money/synonym(caption)", for which no synonym search is designated. Accordingly, the structure template with template ID:7 is not selected.

Subsequently, the synonym-handling section 131 acquires a structure template with template ID:16 from the structure-template management block 151a shown in FIG. 3A. The structure template with template ID:16 is "/magazine/money/caption". In this case, the synonym-handling section 131 confirms that the structure template with template ID:16, i.e., "/magazine/money/caption", matches the tags "magazine" and "money" that are included in the original XPath scheme and are not designated as targets of the synonym search.

At this time, the acquisition section 132a of the file input/output section 132 refers to the structure-posting area 151b (see FIG. 3B) of the structure-index management block 151, using template ID:16, thereby acquiring information (position information) stored in the structure-posting area 151b and associated with template ID:16. Based on this position information, the acquisition section 132a accesses actual data in the database 15, thereby acquiring, as a search result, the following data item contained in the XML document 44 of FIG. 2D:

<caption>approach to stock</caption>

Note that if a conventional search is performed using the XPath scheme "/magazine/money/caption", no data is acquired as the search result. Thus, in the modification of the embodiment, further efficient search than in the embodiment can be realized by enabling a tag, which the user would like to search for using its synonyms, to be designated during XPath search.

In the embodiment, the structured-document search apparatus 10 incorporates the synonym dictionary 14 and database 15. However, the synonym dictionary 14 and database 15 may be separated from the structured-document search apparatus 10, and the storing processing section 12 and search processing section 13 in the apparatus 10 be enabled to access them via, for example, the network. In this case, the synonym dictionary 14 and database 15 may be utilized by a plurality of structured-document search apparatuses 10.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A structured-document search apparatus for searching a plurality of structured documents stored in a database for a document structure in a structured document corresponding to first structure-designating information, in response to a search request containing the first structure-designating information and issued from a client terminal, the first structure-designating information designating an arbitrary document structure including tags, the arbitrary document structure being a logical tree structure represented using the tags, comprising:

structure-template-storing means for storing a plurality of structure templates as templates of tag structures in relation to identifiers assigned to the structure templates, the structure templates corresponding to document structures included in the structured documents stored in the database, the tag structures being logical tree structures represented using tags;

a synonym dictionary which stores synonym group identifiers indicating synonym groups, and sets of tags belonging to the synonym groups, said each synonym group being a set of tags having a common concept;

synonym search means for search processing for searching the synonym dictionary for synonym group identifiers indicating synonym groups to which the tags included in the first structure-designating information belong;

inquiry means for inquiring of a user of the client terminal, when the synonym search means detects the synonym group identifiers indicating synonym groups to which the tags included in the first structure-designating information belong, which one of synonym groups indicated by the synonym group identifiers for said tags should be selected, said tags included in the first structure- designating information corresponding to the detected synonym group identifiers;

structure-designating-information generation means for generating, based on a search result of the synonym search means for search processing, second structure-designating information in which the tags included in the first structure-designating information are replaced with the respective synonym group identifiers based on the user's selection;

synonym-structure-template-storing means for storing synonym structure templates in which all tags included in the structure templates stored in the structure-template-storing means are replaced with the synonym group identifiers indicating the synonym groups to which said all tags belong;

synonym-structure-template-searching means for searching the synonym-structure-template-storing means for a synonym structure template corresponding to the second structure-designating information; and acquisition means for acquiring, from the database, a document structure in a structured document indicated by the structure template searched for by the synonym-structure-template-searching means.

2. The structured-document search apparatus according to claim 1, further comprising:

synonym search means for storing processing operating when the synonym-structure- template-storing means adds a structure template corresponding to a new document structure which does not exist in the synonym-structure-template-storing means, the synonym search means searching the synonym dictionary for synonym group identifiers indicating synonym groups to which all tags included in the added structure template belong, the addition of the structure template being performed in accordance with a request from the client terminal when a structured document is stored into the database or a structured document in the database is updated;

synonym-structure-template generation means for generating a synonym structure template in which said all tags included in the added structure template are replaced with synonym group identifiers which indicate synonym groups corresponding to said all tags and are detected by the synonym search means for storing processing; and synonym- structure-template addition means for adding, to the synonym- structure-template- storing means, the synonym structure template generated by the synonym- structure-template generation means.

3. The structured-document search apparatus according to claim 1, further comprising determination means which operates when the first structure-designating information includes a tag designated by the search request as a target to be subjected to a synonym search, the determination means determining whether a document structure designated by the first structure-designating information except for the tag subjected to the synonym search is identical to a corresponding document structure included in each of structure templates corresponding to the synonym structure templates detected by the synonym-structure-template-searching means, and wherein the acquisition means acquires, from the database, only a document structure in a structured document indicated by the structure template determined to be identical by the determination means.

4. The structured-document search apparatus according to claim 1, wherein the first structure-designating information designates the arbitrary document structure by using a path.

5. A method of searching a plurality of structured documents stored in a database for a document structure in a structured document corresponding to first structure-designating information, in response to a search request containing the first structure-designating information and issued from a client terminal, the first structure-designating information indicating an arbitrary document structure including tags, the arbitrary document structure being a logical tree structure represented using the tags, the method comprising:

searching synonym group identifiers, stored in a synonym dictionary and indicating synonym groups, for synonym group identifiers indicating synonym groups to which the tags included in the first structure-designating information belong, the synonym dictionary storing the synonym group identifiers uniquely assigned to the synonym groups which contain synonyms of tags, and storing the tags belonging to the synonym groups;

causing a user of the client terminal to select one of the synonym groups indicated by a plurality of synonym group identifiers to process a tag of said tags included in the arbitrary document structure, when the searching for synonym group identifiers is performed, and the plurality of synonym group identifiers are detected for the tag of said tags, said tag included in the first structure-designating information corresponding to the detected synonym group identifiers;

generating, based on a search result of the searching and the user's selection, second structure-designating information in which the tags included in the first structure-designating information are replaced with the respective synonym group identifiers;

searching synonym-structure-template- storing means for a synonym structure template corresponding to the second structure-designating information, the synonym-structure-template- storing means storing synonym structure templates in which all tags included in structure templates as templates of tag structures are replaced with synonym group identifiers indicating synonym groups to which said all tags included in the structure templates belong, the structure templates being stored in structure-template-storing means in relation to identifiers assigned to the structure templates, the structure templates corresponding to document structures included in the structured documents stored in the database, the tag structures being logical tree structures represented using the tags; and acquiring, from the database, a document structure in a structured document indicated by a structure template corresponding to the searched synonym structure template.

6. The method according to claim 5, wherein in the generating the second structure-designating-information, said tag included in the first structure-designating information and corresponding to the detected synonym group identifiers is replaced with a synonym group identifier indicating the synonym group selected by the user.

7. The method according to claim 5, further comprising:

determining, when a structured document is stored into the database or a structured document in the database is updated in response to a request from the client terminal, whether the stored or updated structured document includes a new tag structure which is not stored in the structure-template-storing means;

adding, when the stored or updated structured document includes the new tag structure, a structure template corresponding to the new tag structure to the structure-template-storing means;

searching the synonym dictionary for synonym group identifiers indicating synonym groups to which all tags included in the added structure template belong;

generating a synonym structure template in which said all tags included in the added structure template are replaced with synonym group identifiers which indicate the detected synonym groups corresponding to the tags; and adding the generated synonym structure template to the synonym-structure-template-storing means.

8. The method according to claim 5, further comprising determining, when the first structure-designating information includes a tag designated by the search request as a target to be subjected to a synonym search, whether a document structure included in the first structure-designating information except for the designated tag is identical to a corresponding document structure included in each of structure templates corresponding to the synonym structure templates detected in the synonym-structure-template-storing means, and wherein in the acquiring, only a document structure in a structured document indicated by the structure template determined to be identical by the determining is acquired from the database.

9. The method according to claim 5, wherein the first structure-designating information designates the arbitrary document structure by using a path.

10. A storage medium storing data for a structured-document search in which a database storing a plurality of structured documents is searched in response to a search request from a client terminal to detect a document structure included in a structured document corresponding to the search request including first structure-designating information, the first structure-designating information indicating an arbitrary document structure including tags, the arbitrary document structure being a logical tree structure represented using the tags, the storage medium comprising:

a plurality of structure templates as templates of tag structures, the structure templates being associated with identifiers assigned to the structure templates, and corresponding to document structures included in the structured documents stored in the database, the tag structures being logical tree structures represented using tags;

a synonym dictionary which stores synonym group identifiers indicating synonym groups, and sets of tags belonging to the synonym groups, each of the synonym groups being a set of tags having a common concept, wherein the synonym dictionary is searched for synonym group identifiers indicating synonym groups to which the tags included in the first structure-designating information belong and a user selects the synonym groups indicated by the synonym group identifiers to process said tags included in the first structure-designating information, when the synonym dictionary is searched for synonym groups to which the tags belong, said tags included in the first structure-designating information corresponding to the detected synonym group identifiers; and synonym structure templates corresponding to the respective structure templates, the synonym structure templates being generated by replacing all tags, with synonym group identifiers indicating the synonym groups to which said all tags belong, said all tags being included in the structure templates corresponding to the synonym structure templates, wherein tags included in the first structure-designating information are replaced with the respective synonym group identifiers based on the user's selection to generate second structure-designating information, wherein the synonym structure templates are searched for a synonym structure template corresponding to second structure-designating information, the searched synonym structure being used to acquire a document structure in a structured document indicated by the searched synonym structure.

11. The storage medium according to claim 10, wherein the document structure of the structured document is designated by generating a path.

* * * * *